United States Patent
Jin et al.

(10) Patent No.: US 11,885,980 B2
(45) Date of Patent: Jan. 30, 2024

(54) SUSPENSION PROJECTION DEVICE BASED ON REFLECTION MODULATION TYPE METASURFACE

(71) Applicants: Zhongwei Jin, Hangzhou (CN); Shengtao Mei, Hangzhou (CN)

(72) Inventors: Zhongwei Jin, Hangzhou (CN); Shengtao Mei, Hangzhou (CN)

(*) Notice: Subject to any disclaimer, the term of this patent is extended or adjusted under 35 U.S.C. 154(b) by 322 days.

(21) Appl. No.: 17/484,114

(22) Filed: Sep. 24, 2021

(65) Prior Publication Data

US 2022/0179124 A1 Jun. 9, 2022

(30) Foreign Application Priority Data

Dec. 8, 2020 (CN) .......................... 202011441366.4

(51) Int. Cl.
*G02B 3/08* (2006.01)
*G03B 21/28* (2006.01)
*G02B 1/00* (2006.01)

(52) U.S. Cl.
CPC ............... *G02B 3/08* (2013.01); *G03B 21/28* (2013.01); *G02B 1/002* (2013.01)

(58) Field of Classification Search
CPC .......... G03B 21/28; G03B 35/24; G02B 3/08; G02B 1/002; G02B 3/02; G02B 2003/0093; G02B 3/0056; G02B 30/56; G03H 1/2205
See application file for complete search history.

(56) References Cited

U.S. PATENT DOCUMENTS

| | | | |
|---|---|---|---|
| 10,613,254 B2* | 4/2020 | Czaplewski | ............. G02B 3/08 |
| 10,670,782 B2* | 6/2020 | Arbabi | ................ G02B 5/1876 |
| 2017/0212285 A1* | 7/2017 | Arbabi | .................... G02B 1/002 |
| 2019/0025464 A1* | 1/2019 | Czaplewski | ............. G02B 3/08 |
| 2022/0082730 A1* | 3/2022 | Bi | ......................... G02B 5/3083 |
| 2023/0194760 A1* | 6/2023 | Hao | ....................... G02B 1/002 359/642 |

* cited by examiner

*Primary Examiner* — Bao-Luan Q Le
(74) *Attorney, Agent, or Firm* — Taft Stettinius & Hollister LLP; Derek B. Lavender

(57) ABSTRACT

The present disclosure relates to a suspension projection device based on a reflection modulation type metasurface. The suspension projection device comprises a metasurface, wherein a cubic column array is machined on one side of the metasurface, the cross section of a cubic column in the cubic column array is a square, the side length of the square ranges from 10 to 500 μm, and the height of the cubic column ranges from 50 to 800 μm; and incident light enters from one end of the cubic column, and exits from the other end of the cubic column after several total internal reflections within column. According to the suspension projection device, the cost of suspension projection is reduced.

6 Claims, 5 Drawing Sheets

SUSPENSION PROJECTION DEVICE BASED ON REFLECTION MODULATION TYPE METASURFACE

CROSS REFERENCE TO RELATED APPLICATION(S)

This patent application claims the benefit and priority of Chinese Patent Application No. 202011441366.4, filed on Dec. 8, 2020, the disclosure of which is incorporated by reference herein in its entirety as part of the present application.

TECHNICAL FIELD

The present disclosure relates to the technical field of projection, and particularly relates to a suspension projection device based on a reflection modulation type metasurface.

BACKGROUND ART

Most of traditional naked-eye holographic imaging technologies need certain media (such as water mist) to scatter light beams so as to achieve the effect of naked-eye observation. According to an air suspension projection technology proposed in recent years, thin glass sheets (or metallic planar waveguides) with reflection films plated on the two sides are stacked to achieve the effect that light sources on one side of a waveguide array flat plate are collected and gathered into a real image on the other side of the flat plate again.

In the existing scheme, hundreds of ultra-thin (hundreds of μm) glass sheets with double sides plated with reflective films are adhered through ultra-thin (hundreds of μm) photosensitive glue to form an array flat plate. The scheme is numerous in machining steps, non-standard in process and extremely complex. In addition, if light sources are converged at the same time in two dimensions, two thin array flat plates with the same size need to be orthogonally overlapped. The above factors cause the problems that the existing air suspension projection technology is extremely high in manufacturing cost and low in resolution, and the technology is not easy to popularize.

The metasurface proposed by Harvard University Scientific Research Group in 2011 is widely applied to various scenarios by global researchers with the characteristics of precise control of beam wavefront phase and amplitude and ultrathin nature. The metasurface holographic imaging is a very important research direction, and far-field holographic imaging is realized mainly by modulating the phase or amplitude of the wavefront of a collimated light beam. However, as optical metasurface holographic imaging needs to modulate the phase or amplitude for light waves, the design of a unit structure needs to be limited in a sub-wavelength range. In addition, once the device is machined, the modulation mode is fixed. At present, a structure with adjustable phase or amplitude is difficult to realize in a range of hundreds of nanometers in a related process, so that a dynamic holographic color image is difficult to realize.

SUMMARY

Based on this, the present disclosure aims to provide a suspension projection device based on a reflection modulation type metasurface, the suspension projection cost is reduced, and the device is simple in structure, easy to integrate and suitable for mass production.

To achieve the purpose, the present disclosure provides the following scheme:

The suspension projection device based on a reflection modulation type metasurface comprises a metasurface, wherein a cubic column array is machined on one side of the metasurface, the cross section of a cubic column in the cubic column array is a square, the side length of the square ranges from 10 to 500 μm, and the height of the cubic column ranges from 50 to 800 μm; and Incident light enters from one end of the cubic column, and exits from the other end of the cubic column after several total internal reflections within column.

Optionally, the side surfaces of the cubic columns in the cubic column array are parallel to each other or perpendicular to each other; and when the metasurface is used, an included angle between the projection of one diagonal line of the square section of the cubic column in the vertical direction and the horizontal plane is 90°.

Optionally, the material of the metasurface is transparent glass or transparent resin.

Optionally, the side length of the square is 200 μm, and the height of the cubic column is 500 μm.

Optionally, the distance between every two cubic columns is 600 μm.

Optionally, the period range of the cubic column array is 50 to 1000 μm.

According to the specific embodiment provided by the present disclosure, the present disclosure has the following technical effects:

The size of a traditional metasurface unit structure is enlarged, the cubic column array is machined on one side of a glass or resin substrate, wherein the cross section of a cubic column in the cubic column array is square, and incident light enters from one end of the cubic column, and exits from the other end of the cubic column after several total internal reflections within column, so that the air suspension projection of a complete metasurface is realized. The suspension projection device is simpler in structure design, the cost of the air suspension projection device is reduced, and the device is easy to integrate and suitable for mass production.

BRIEF DESCRIPTION OF THE DRAWINGS

To describe the technical scheme in the embodiments of the present disclosure or in the prior art more clearly, the following briefly introduces the attached figures required for describing the embodiments. Apparently, the attached figures in the following description show merely some embodiments of the present disclosure, and those skilled in the art may still derive other attached figures from these attached figures without creative efforts.

DETAILED DESCRIPTION OF THE EMBODIMENTS

The following clearly and completely describes the technical scheme in the embodiments of the present disclosure with reference to the attached figures in the embodiments of the present disclosure. Apparently, the described embodiments are merely a part rather than all of the embodiments of the present disclosure. All other embodiments obtained by those skilled in the art based on the embodiments of the present disclosure without creative efforts shall fall within the protection scope of the present disclosure.

The present disclosure aims to provide a suspension projection device based on a reflection modulation type metasurface, the suspension projection cost is reduced, and the device has the characteristics of simple structure and easy integration and is suitable for mass production.

To make the foregoing objective, features and advantages of the present disclosure clearer and more comprehensible, the present disclosure is further described in detail below with reference to the attached figures and specific embodiments.

Figure 1:
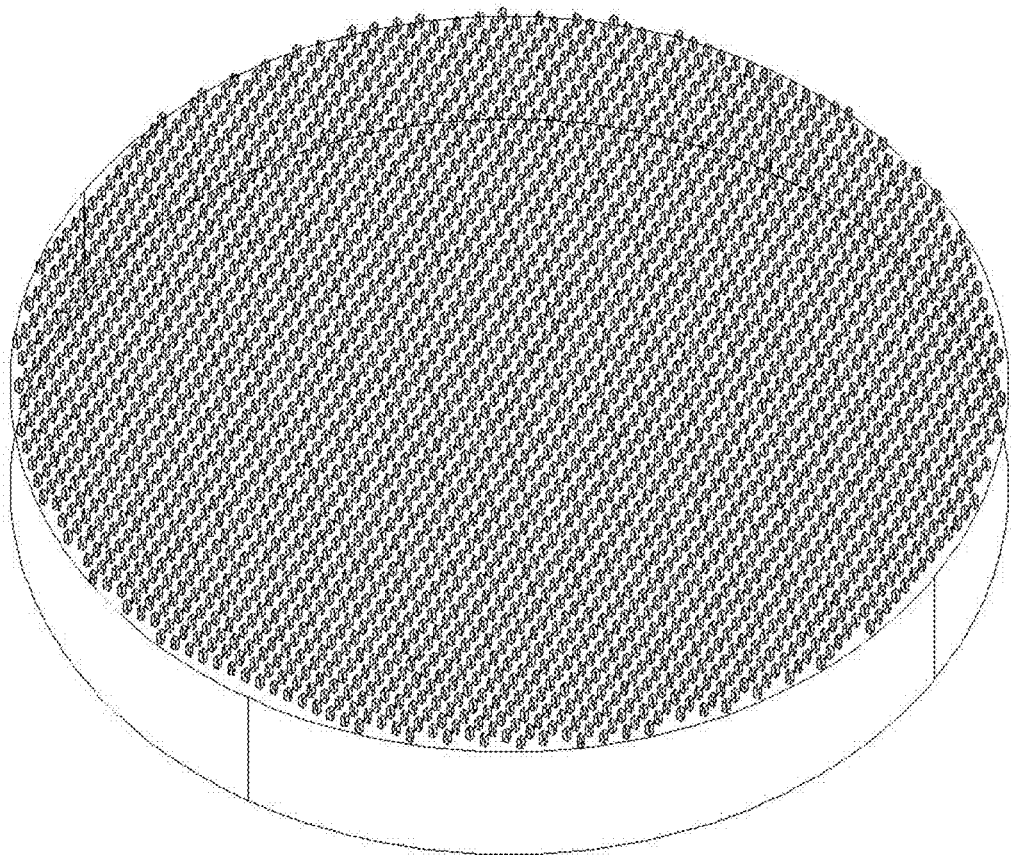
FIG. 1 is a schematic diagram of a suspension projection device based on a reflection modulation type metasurface in the present disclosure.

FIG. 1 is a schematic diagram of a suspension projection device based on a reflection modulation type metasurface in the present disclosure. As shown in FIG. 1, the suspension projection device based on a reflection modulation type metasurface comprises a metasurface, wherein a cubic column array is machined on one side of the metasurface, the cross section of a cubic column in the cubic column array is a square, the side length of the square ranges from 10 to 500 µm, the height of the cubic column ranges from 50 to 800 µm, and the period range of the cubic column array is 50 to 1000 µm.

Incident light enters from one end of the cubic column, and exits from the other end of the cubic column after several total internal reflections within column.

The side surfaces of the cubic columns in the cubic column array are parallel to each other or perpendicular to each other; and when the metasurface is used, an included angle between the projection of one diagonal line of the square section of the cubic column in the vertical direction and the horizontal plane is 90°.

The material of the metasurface is transparent glass or transparent resin.

The side length of the square is 200 µm, and the height of the cubic column is 500 µm.

The distance between every two cubic columns is 600 µm.

The total internal reflection angle of the metasurface glass material is about 42°.

Figure 2:
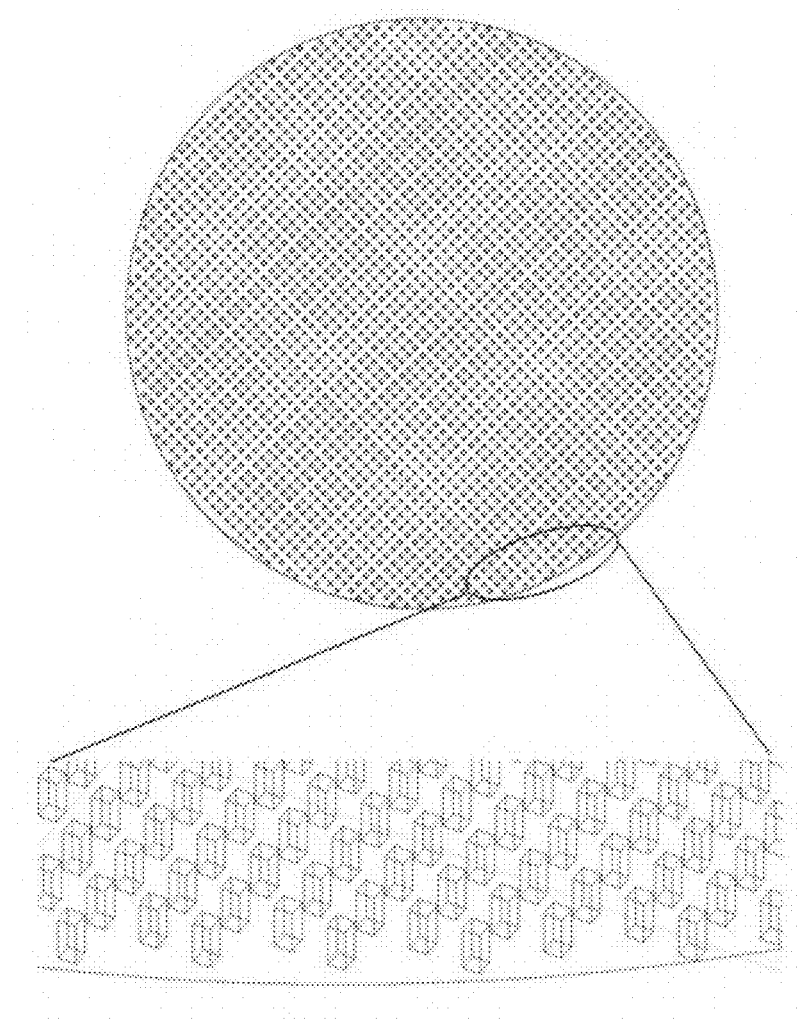
FIG. 2 is a top view of the suspension projection device based on the reflection modulation type metasurface in the present disclosure.
Figure 3:
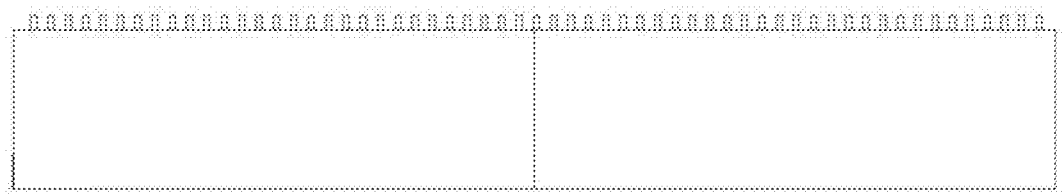
FIG. 3 is a front view of the suspension projection device based on the reflection modulation type metasurface in the present disclosure.
Figure 4:
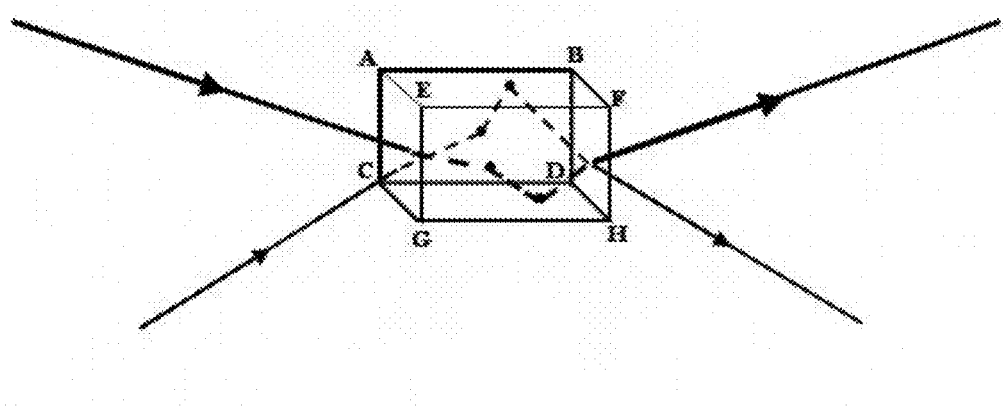
FIG. 4 is a reflection modulation schematic diagram of a cubic column in the present disclosure.
Figure 5:
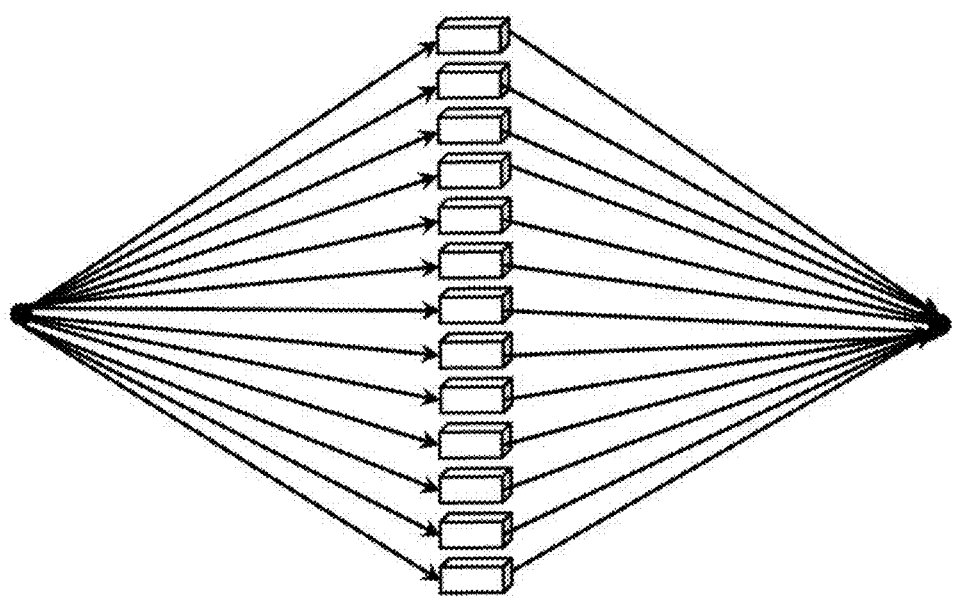
FIG. 5 is a reflection imaging schematic diagram I of cubic columns in the present disclosure.
Figure 6:
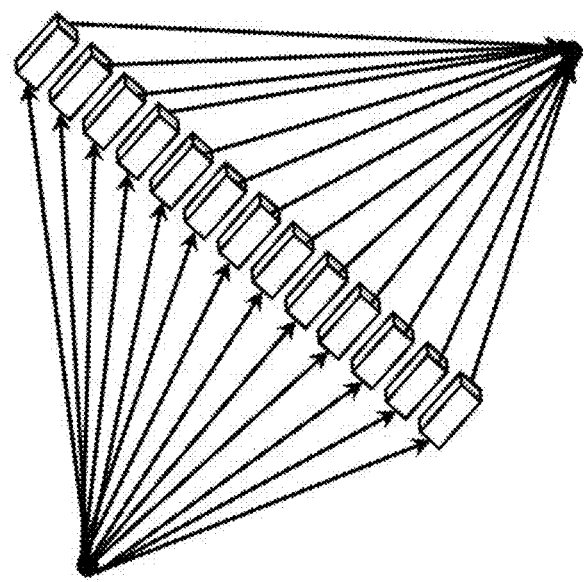
FIG. 6 is a reflection imaging schematic diagram II of cubic columns in the present disclosure.
Figure 7:
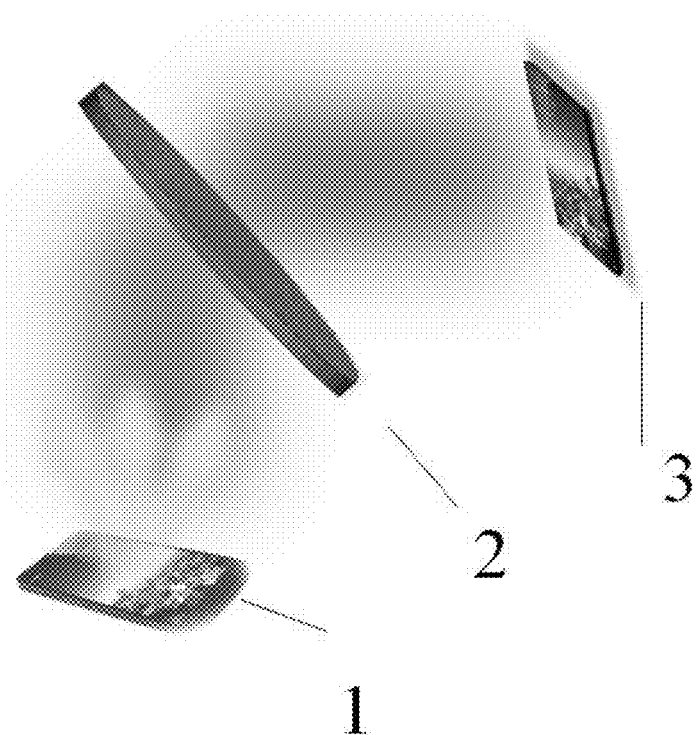
FIG. 7 is a projection schematic diagram I of the suspension projection device based on a reflection modulation type metasurface in the present disclosure.
Figure 8:
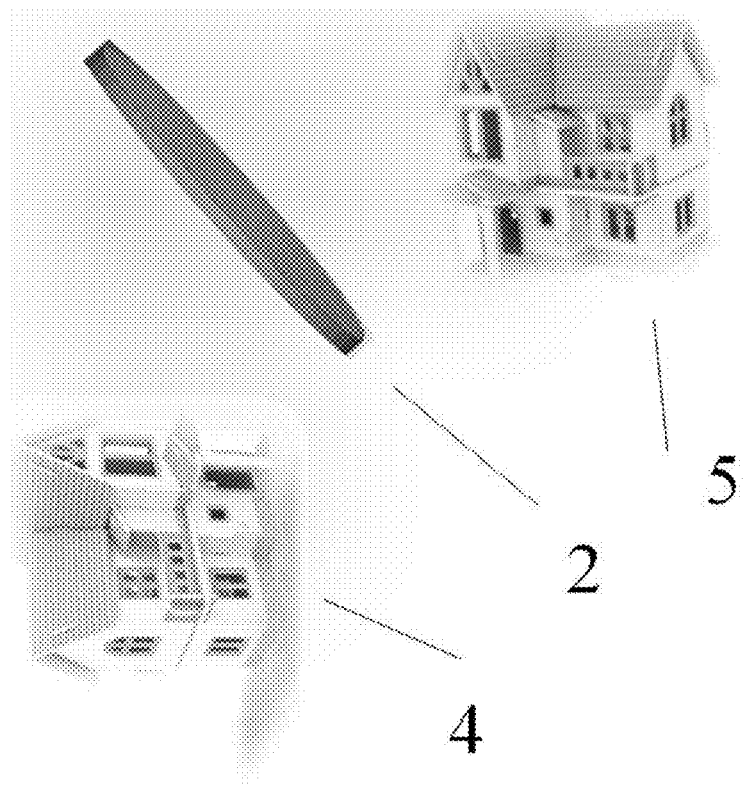
FIG. 8 is a projection schematic diagram II of the suspension projection device based on a reflection modulation type metastructure surface in the present disclosure.

According to the technology, the size of a single structural unit of the metasurface is properly amplified to the submillimeter magnitude, and the phase or amplitude modulation function of the single unit is modified into a reflection modulation function, so that full-color optical metasurface dynamic holographic projection is realized. The three-dimensional structure of the metasurface device is as shown in FIG. 1, FIG. 2 is a top view corresponding to the metasurface, FIG. 3 is a front view corresponding to the metasurface, and the whole metasurface structure is an array of cubic columns machined on one side surface of transparent and smooth glass or resin glass and other similar materials based on certain technology. The lower portion of FIG. 2 is an enlarged portion of the metasurface, showing the arrangement of a cubic column array within the circled area in the top view, wherein the cubic column is 200 µm in length and width and 500 µm in height, and the array period of the cubic columns is 600 and the set of size parameters of the cubic column array has been successfully used for machining and testing (notes: the cubic column array is not necessarily arranged periodically and can also be aperiodic, and the function of the metasurface is not affected). A single column can enable light rays incident in any direction to be reflected to the other side of the column in a symmetrical manner, as shown in FIG. 4. Based on the basic principle as shown in FIG. 4, all light rays, emitted by one point light source, that can be received by the metasurface are symmetrically reflected to the other side of the metasurface and reconverged into a point light source to form a real image, as shown in FIG. 5 to FIG. 6. It can be obtained by observing FIG. 5 to FIG. 6 that as long as the area of the metasurface is larger than a certain degree, all the light rays emitted by the point light source to the metasurface can be collected, wherein all light rays of which incident angles (incident angles with the side walls of the cubic columns as interfaces) are greater than total reflection angles (approximately 42° when the glass material is used) emitted by the point light source to the metasurface can be collected. In practical use, in order to enable a single column to symmetrically converge the energy of the light rays in two orthogonal propagation directions, the diagonal of the square cross-section of the single column needs to be in the vertical direction, in other words, the columns on the metasurface need to be rotated at an angle of 45°, as shown in FIG. 2 in the top view. In addition, it is not difficult to see that the object images are symmetrical about the plane where the metasurface is located, so that when the object is on the normal of the metasurface, the image is also on the normal equidistant on the other side, the object images are easily overlapped together when viewed by naked eyes (FIG. 5), and the metasurface can be placed obliquely in actual use to separate the objects and the images in line of sight (FIG. 6). The point light source is popularized into a 2D light source 1 (such as a mobile phone screen), and full-color 2D holographic imaging 3 can be achieved through the metasurface 2, as shown in FIG. 7; and the point light source is popularized into a 3D light source 4, and full-color 3D holographic imaging 5 can be achieved through the metasurface 2, as shown in FIG. 8. As the formed image is a real image, the holographic image suspended in the air can be observed by naked eyes.

According to the present disclosure, only one optical transparent material is needed for machining, and other materials or media are not needed; and the device is realized through an existing standard process, the process is mature and has great cost advantages, and therefore, the device can more easily realize ultra-high resolution and lighter and thinner design to adapt to scenes requiring high definition and integration.

According to the present disclosure, an air projection technology which can be realized only by two composite flat plates machined by a complex process in the prior art is realized by a single complete metasurface structure, and the device is more beautiful and simpler in structure design and is easy to integrate. The machining mode is consistent with the existing standard process, the cost is low, and mass machining and production are easier. Ultrahigh resolution can be realized more easily, and the device is suitable for more rich and high-definition scenes.

All embodiments in this specification are described in a progressive manner. Each embodiment focuses on differences from other embodiments. For the part that is the same or similar between different embodiments, reference may be made between the embodiments.

Several examples are used for illustration of the principles and implementation methods of the present disclosure. The description of the embodiments is used to help illustrate the method and the core principles of the present disclosure; and meanwhile, those skilled in the art can make various modifications in terms of specific embodiments and scope of application in accordance with the teachings of the present disclosure. In conclusion, the content of this specification shall not be construed as a limitation to the present disclosure.

What is claimed is:

1. A suspension projection device based on a reflection modulation type metasurface, comprising a metasurface, wherein a cubic column array is machined on one side of the metasurface, the cross section of a cubic column in the cubic column array is a square, the side length of the square ranges from 10 to 500 μm, and the height of the cubic column ranges from 50 to 800 μm; and incident light enters from one end of the cubic column, is totally reflected in the cubic column, and exits from the other end of the cubic column.

2. The suspension projection device based on a reflection modulation type metasurface according to claim 1, wherein the side surfaces of the cubic columns in the cubic column array are parallel to each other or perpendicular to each other; and when the metasurface is used, an included angle between the projection of one diagonal line of the square section of the cubic column in the vertical direction and the horizontal plane is 90°.

3. The suspension projection device based on a reflection modulation type metasurface according to claim 1, wherein the material of the metasurface is transparent glass or transparent resin.

4. The suspension projection device based on a reflection modulation type metasurface according to claim 1, wherein the side length of the square is 200 μm, and the height of the cubic column is 500 μm.

5. The suspension projection device based on a reflection modulation type metasurface according to claim 4, wherein the distance between every two cubic columns is 600 μm.

6. The suspension projection device based on a reflection modulation type metasurface according to claim 1, wherein the period range of the cubic column array is 50 to 1000 μm.

* * * * *